US009009722B2

(12) United States Patent
Bello et al.

(10) Patent No.: US 9,009,722 B2
(45) Date of Patent: Apr. 14, 2015

(54) COLLABORATIVE NEGOTIATION OF SYSTEM RESOURCES AMONG VIRTUAL SERVERS RUNNING IN A NETWORK COMPUTING ENVIRONMENT

(71) Applicant: International Business Machines Corporation, Armonk, NY (US)

(72) Inventors: Adekunle Bello, Pflugerville, TX (US); Aruna Yedavilli, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 247 days.

(21) Appl. No.: 13/759,479

(22) Filed: Feb. 5, 2013

(65) Prior Publication Data

US 2014/0222889 A1    Aug. 7, 2014

(51) Int. Cl.
*G06F 9/455* (2006.01)
*H04L 29/06* (2006.01)
*H04L 1/18* (2006.01)
*H04L 5/00* (2006.01)
*H04L 12/24* (2006.01)
*H04L 12/911* (2013.01)

(52) U.S. Cl.
CPC ........ *H04L 29/06537* (2013.01); *H04L 1/1893* (2013.01); *H04L 5/0035* (2013.01); *H04L 41/0896* (2013.01); *H04L 47/70* (2013.01)

(58) Field of Classification Search
CPC ................ H04L 1/1893; H04L 5/0035; H04L 29/08153; H04L 41/0896; H04L 47/70; H04L 63/10; G06F 9/5027
USPC ....................................... 718/104
See application file for complete search history.

(56) References Cited

U.S. PATENT DOCUMENTS

| | | | |
|---|---|---|---|
| 2008/0028410 A1* | 1/2008 | Cherkasova et al. | 718/104 |
| 2008/0034370 A1* | 2/2008 | Huizenga | 718/104 |
| 2009/0138887 A1* | 5/2009 | Uehara et al. | 718/104 |
| 2011/0126207 A1 | 5/2011 | Wipfel et al. | |
| 2011/0145153 A1 | 6/2011 | Dawson et al. | |
| 2011/0191781 A1 | 8/2011 | Karanam et al. | |
| 2011/0307898 A1 | 12/2011 | Fischer et al. | |
| 2012/0042256 A1 | 2/2012 | Jamjoom et al. | |
| 2012/0060165 A1 | 3/2012 | Clarke | |
| 2012/0291039 A1 | 11/2012 | Heydon et al. | |
| 2013/0160008 A1* | 6/2013 | Cawlfield et al. | 718/1 |
| 2013/0290972 A1* | 10/2013 | Cherkasova et al. | 718/103 |
| 2013/0339972 A1* | 12/2013 | Zhang et al. | 718/104 |

* cited by examiner

*Primary Examiner* — Krisna Lim
(74) *Attorney, Agent, or Firm* — Patrick J. Daugherty; Driggs, Hogg, Daugherty & Del Zoppo Co., LPA (57) ABSTRACT

Virtual machines within a network computing environment negotiate among themselves with regard to the sharing of resources via respective resource managers. The resource agent monitors resource allocation patterns of its virtual machine and responsively updates usage data in a resource availability map and compares the updated usage data to a minimum operational requirements threshold and a surplus amount threshold. If the updated usage fails to meet the minimum operational requirements threshold, the resource agent determines a needed shortfall amount of resources, searches the resource availability map for offers of the shortfall from resource agents, and sends out a request to a resource agent offering the shortfall amount. If the updated usage data meets the minimum operational requirements threshold, the resource agent determines a surplus amount of a resource that exceeds the surplus amount threshold and creates and broadcasts an offer of the surplus amount to the other resource agents.

20 Claims, 3 Drawing Sheets

COLLABORATIVE NEGOTIATION OF SYSTEM RESOURCES AMONG VIRTUAL SERVERS RUNNING IN A NETWORK COMPUTING ENVIRONMENT

FIELD OF THE INVENTION

The present invention generally relates to network computing environment computing. More particularly, the present invention relates to the negotiation of the use of shared services within a network computing environment.

BACKGROUND

A network computing environment, which may sometimes be referred to as a cloud computing environment, enables a plurality of different computer resources to interact cooperatively, abstracted (in some examples into a cloud layer) so that disparate devices appear to an end-user as a single pool of seamless resources. Examples of computer resources amenable to network computing or cloud environments include physical programmable devices (for example, servers, clients, etc.), storage and other memory devices, and logical computing applications and engines (for example, business and other software applications).

On a typical network computing infrastructure, physical and logical machines, platform services and software services are often shared and used by multiple users, as well as by other network computing systems. Due to the dynamic nature of workloads running on network computing systems, resource needs go through periods of high usage and dips in usage. It is often difficult to determine at what point a network computing environment service's need for resources will spike and for how long, and coupled with the fact that resources on a system hosting a network computing environment may be scarce, it is not immediately clear how to allocate them optimally.

BRIEF SUMMARY

In one aspect of the present invention, a method enables network computing environment services to negotiate with regard to the sharing of resources. Each of a plurality of network computing environment virtual machines includes a resource agent. The resource agent monitors resource allocation patterns of its virtual machine, and responsively updates usage data in a resource availability map of the virtual machine. The updates may include a current limited resource usage, a scheduled increase or decrease of the current usage, or a projected increase or decrease of the current usage. The resource agent compares the updated usage data in the resource availability map usage data to a minimum operational requirements threshold, and to a surplus amount threshold that is greater than or equal to the minimum operational requirements threshold. If the updated usage fails to meet the minimum operational requirements threshold, the resource agent determines an additional shortfall amount of resources that are needed to meet the minimum operational requirements threshold, searches the resource availability map for offers of the shortfall amount from resource agents of other virtual machines that are registered into a resource sharing arrangement with the virtual machine within the network computing environment, and sends out a request to one of the other resource agents that is associated with an offer of the shortfall amount. If the compared updated usage data meets the minimum operational requirements threshold, the resource agent determines a surplus amount of a resource that exceeds an amount of the resource needed to meet the surplus amount threshold, and creates and broadcasts an offer of the surplus amount to the resource agents of the other virtual machines that are registered into the resource sharing arrangement.

In another aspect, a system has a processing unit, computer readable memory and a tangible computer-readable storage medium with program instructions, wherein the processing unit, when executing the stored program instructions, provides a resource agent of a virtual machine. The resource agent monitors resource allocation patterns of its virtual machine, and responsively updates usage data in a resource availability map of the virtual machine. The updates may include a current limited resource usage, a scheduled increase or decrease of the current usage, or a projected increase or decrease of the current usage. The resource agent compares the updated usage data in the resource availability map usage data to a minimum operational requirements threshold, and to a surplus amount threshold that is greater than or equal to the minimum operational requirements threshold. If the updated usage fails to meet the minimum operational requirements threshold, the resource agent determines an additional shortfall amount of resources that are needed to meet the minimum operational requirements threshold, searches the resource availability map for offers of the shortfall amount from resource agents of other virtual machines that are registered into a resource sharing arrangement with the virtual machine within the network computing environment, and sends out a request to one of the other resource agents that is associated with an offer of the shortfall amount. If the compared updated usage data meets the minimum operational requirements threshold, the resource agent determines a surplus amount of a resource that exceeds an amount of the resource needed to meet the surplus amount threshold, and creates and broadcasts an offer of the surplus amount to the resource agents of the other virtual machines that are registered into the resource sharing arrangement.

In another aspect, a computer program product has a tangible computer-readable storage medium with computer readable program code embodied therewith, the computer readable program code comprising instructions that, when executed by a computer processing unit, cause the computer processing unit to provide a resource agent of a virtual machine. The resource agent monitors resource allocation patterns of its virtual machine, and responsively updates usage data in a resource availability map of the virtual machine. The updates may include a current limited resource usage, a scheduled increase or decrease of the current usage, or a projected increase or decrease of the current usage. The resource agent compares the updated usage data in the resource availability map usage data to a minimum operational requirements threshold, and to a surplus amount threshold that is greater than or equal to the minimum operational requirements threshold. If the updated usage fails to meet the minimum operational requirements threshold, the resource agent determines an additional shortfall amount of resources that are needed to meet the minimum operational requirements threshold, searches the resource availability map for offers of the shortfall amount from resource agents of other virtual machines that are registered into a resource sharing arrangement with the virtual machine within the network computing environment, and sends out a request to one of the other resource agents that is associated with an offer of the shortfall amount. If the compared updated usage data meets the minimum operational requirements threshold, the resource agent determines a surplus amount of a resource that exceeds an amount of the resource needed to meet the surplus amount threshold, and creates and broadcasts an offer of the surplus amount to the resource agents of the other virtual machines that are registered into the resource sharing arrangement.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical aspects, examples and embodiments of the invention, and therefore should not be considered as limiting the scope of the invention. In the drawings, like numbering represents like elements.

DETAILED DESCRIPTION

Figure 1:
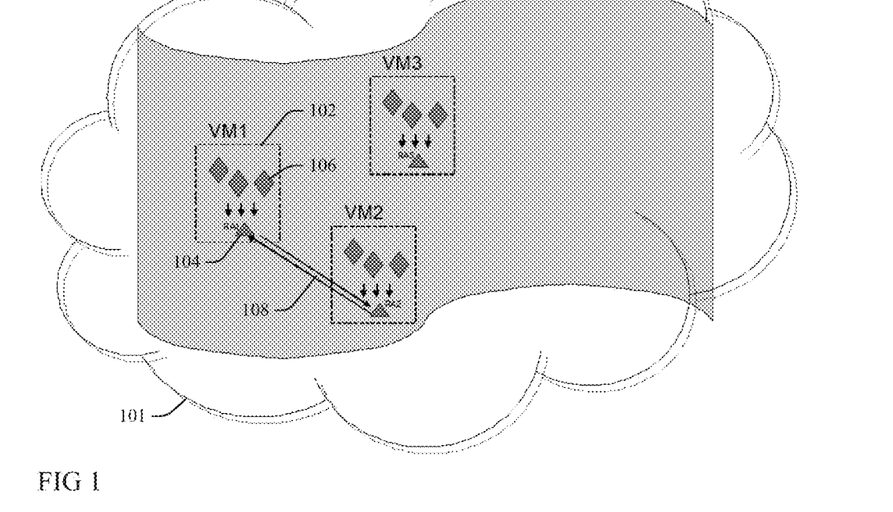
FIG. 1 is a block diagram illustration of a network computing architecture according to the present invention.

Certain network computing environment resources have limits of availability, such as an amount of configured memory available on a storage device, or an amount of time that a central processing unit (CPU) is free or available for use in a processing task, and still other network computing resources present challenges to effective sharing management. FIG. 1 illustrates a cloud network computing environment 101 according to the present invention that includes a plurality of virtual machines (VM) 102. A virtual machine 102 is a software implementation of a machine (i.e. a computer) that executes programs like a physical machine.

Virtual machines may be categorized as system virtual machines and process virtual machines, in one aspect based on their use or degree of correspondence to a real machine. A system virtual machine typically provides a complete system platform which supports the execution of a complete operating system (OS). These usually emulate an existing architecture, and may be built with the purpose of providing a platform to run programs for which real hardware is not available for use (for example, executing software on otherwise obsolete platforms), or to provide multiple instances of virtual machines for increasing efficiencies in the use of fixed computing resources. A process virtual machine (also sometimes referred to as a language virtual machine) is typically designed to run a single program, or to support a single process. Process virtual machines are usually closely suited to one or more programming languages and built with the purpose of providing program portability and flexibility. One characteristic of a virtual machine 102 is that software running inside is typically limited to the resources and abstractions 106 provided by the virtual machine 102, which cannot be operated outside of its virtual machine environment 102.

Each of the virtual machines 102 hosts a resource agent (RA) 104 that is responsible for monitoring resource allocation patterns for one or more of limited resources 106 of its respective virtual machine 102. The limited resources 106 include storage devices, central processing units (CPU) operating within the virtual machine 102 environment, and still other virtual machine computational resources that have fixed or maximum limits of availability will be apparent to one skilled in the art.

The resource agents 104 are registered with a group networking service 108 that facilitates direct communication between the resource agents 104. The group service 108 may be a computer networking multicast group, wherein a multicast is a delivery of a single message or other data or information item to a group of destination computers simultaneously in a single transmission from a source, and wherein copies are generally automatically created in other network elements (routers, etc.) when required by a topology of the network. Multicast is most commonly implemented in Internet Protocol (IP) applications of streaming media at the IP routing level, where routers create optimal distribution paths for datagrams sent to the multicast destination addresses. At a data link layer, multicast describes one-to-many distribution including ethernet multicast addressing, Asynchronous Transfer Mode (ATM) point-to-multipoint virtual circuits (P2MP) and Infiniband multicast.

Thus, the resource agents 104 are configured to communicate directly with each other in order to negotiate among themselves with regard to the efficient use of their limited resources 104 by their own or others of the virtual machines 102 in response to identifying short-term, temporary spikes in resource needs or availability.

Figure 2:
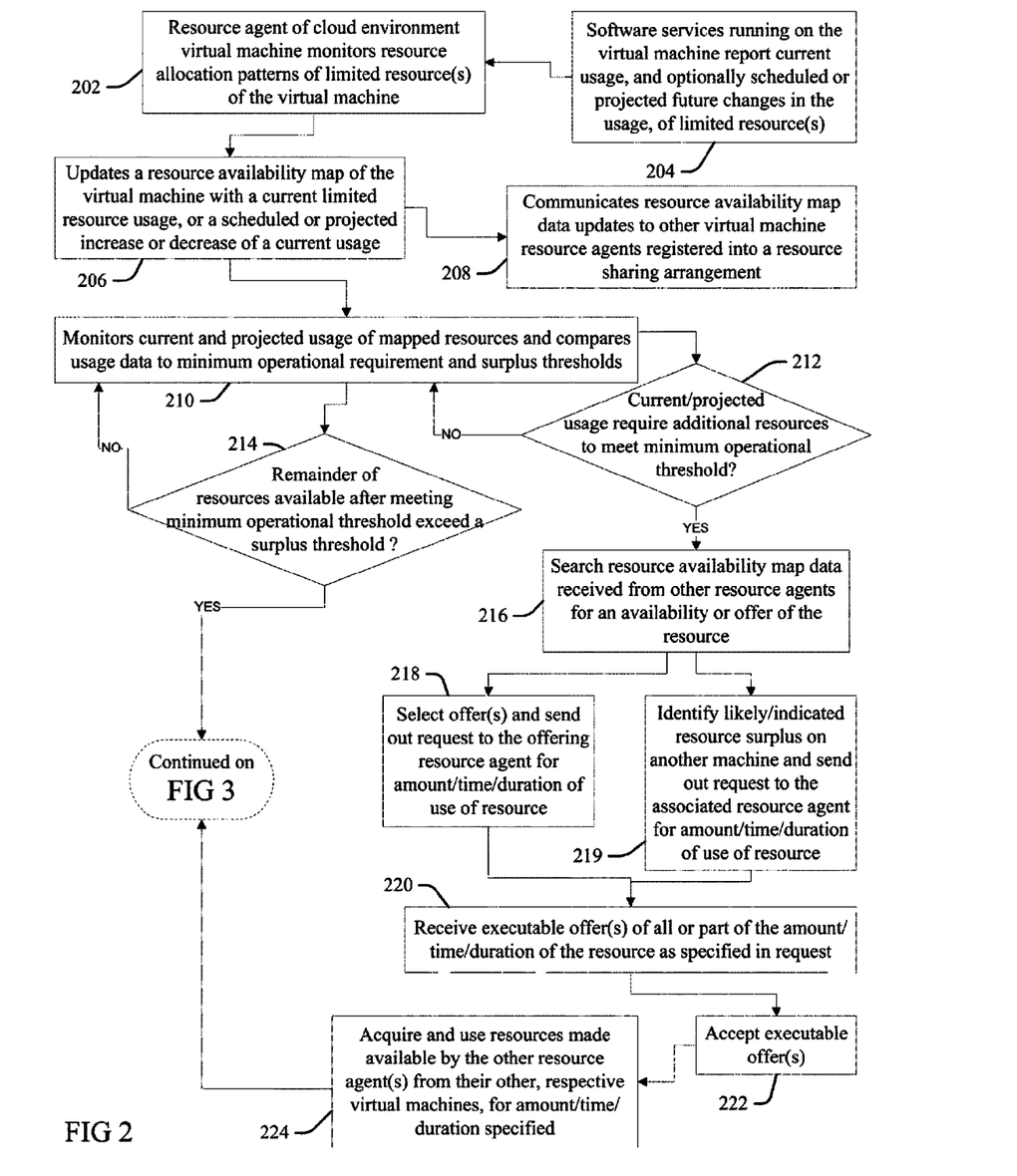
FIG. 2 is a block diagram illustration of a method, process or system according to the present invention for network computing services to negotiate among themselves with regard to the efficient sharing of limited resources.

More particularly, FIG. 2 illustrates a method, process or system according to the present invention for cloud services to negotiate among themselves with regard to the efficient sharing of limited resources in response to identifying short-term, temporary spikes in resource needs or availability. At 202 a resource agent of one of a plurality of cloud network computing environment virtual machines monitors resource allocation patterns of one or more limited resources of its respective virtual machine. In one aspect, the monitoring at 202 includes software services running on the virtual machine reporting at 204 a current usage of one or more of its limited resources to the virtual machine resource agent. In some aspects, the software services also report at 204 scheduled or projected future changes (increases or decreases) of its current limited resource usage.

At 206 the resource agent updates usage data in a resource availability map of the virtual machine with a current limited resource usage, or a scheduled or projected increase or decrease of a current usage, including as reported at 204. The resource availability map reflects current and specified future loads and amounts of available memory or central processing unit time, and also projected needs over future time periods as extrapolated or estimated from historic data. In one aspect, at 208 the resource agent communicates the updates to the resource availability map data to the resource agents of one or more other virtual machines that are registered into a resource sharing arrangement with the virtual machine within the network computing environment, for example by a multicast broadcast.

At 210 the resource agent continually monitors the current usage and projected usage of resources mapped to the resource map and compares the usage data to one or more operational requirement and surplus amount thresholds of the virtual machine. Comparisons to an operational requirement threshold may trigger a determination at 212 of an additional, shortfall amount of resources that are needed in view of the updated usage data in the mapped data to meet operational requirements of the virtual machine (i.e. the minimum operational threshold); and to a surplus threshold or at 214 that the virtual machine limited resources are more than sufficient to meet operational requirements of the virtual machine, and therefore that a remainder of available resources still available after meeting the current or projected usage exceeding the surplus threshold may be available for sharing with other virtual machines.

Determining at 212 that the mapped current or projected usage of the resources will require additional resources to meet operational requirements of the virtual machine may include the resource agent determining that its virtual machine is reaching a critical point, for example that it may run out of an indicated resource in order to support current or projected processing or application needs. Still other needs for resources in additional to the available capacity of its own limited resources may be recognized at 212. Accordingly, in response, at 216 the resource agent searches resource availability map data received from the resource agents of one or more other virtual machines that are registered into the resource sharing arrangement with the virtual machine within the network computing environment for an appropriate, available or offered resource, or for an offer of the resource. At 218 the resource agent selects one or more of listed, current resource offers and sends out a request to the resource agent associated with the offer that details a requested amount of the resource, and requested time duration for use of the requested resource. In some aspects, at 219 the resource agent reviews the resource map data for usage data broadcast and stored from the other virtual machines and itself identifies a likely or indicated resource surplus on another machine and creates and sends out a request to the resource agent associated with the other machine with the likely/indicated surplus that details a requested amount of the resource, and a requested time duration for use of the requested resource.

At 220 the resource agent receives one or more executable offers of all or part of the amount, time and duration of the use of the resource as specified in the request at 218 or 219 from one or more other virtual machine resource agents that received the respective request. At 222 the present machine resource agent accepts one or more of the offers, which may include determining a best fit or most favorable terms and responsively selecting between multiple offers. Thus, at 224 the resource agent acquires and uses the resources made available by the other resource agent(s) from their other, respective virtual machines, for the amount or time specified in the accepted offer(s).

Figure 3:
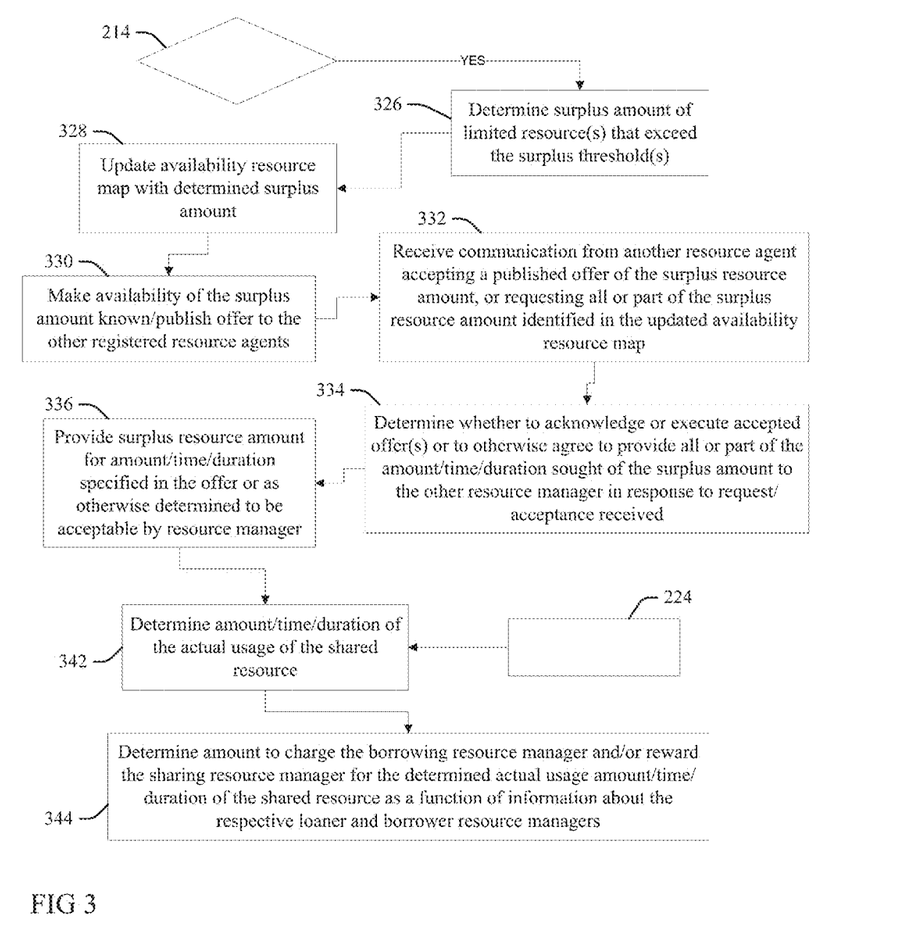
FIG. 3 is a block diagram illustration of another aspect of the method, process or system of FIG. 2.

Referring now to FIG. 3, which continues the process and system described thus far in FIG. 2, in response to determining at 214 (FIG. 2) that the virtual machine limited resources are more than sufficient to meet operational requirements of the virtual machine (i.e. the minimum operational threshold), at 326 the resource agent determines a surplus amount of a limited resource that exceeds an amount of the resource needed to meet the surplus amount threshold of the virtual machine. The surplus threshold may be higher than the minimum operational threshold, providing for a tolerance or buffer amount of the resources that may be retained in order to assure that operational requirements of the virtual machine are met, so that the loss of any surplus amount made available to other virtual machines over the surplus threshold amount will not negatively impact performance of the virtual machine. At 328 the resource agent updates the availability resource map with this determined surplus amount, and at 330 makes the availability of the surplus amount known to the resource agents of the other registered virtual machines. In some aspects, updating the availability resource map at 328 provides notice of the surplus to each of the other resource agents at 330 via their own continual or repetitive updating of the data of availability resource map data stored locally by each of the other resource agents.

In another aspect, making the availability of the surplus known at 330 includes publishing a notice or offer of the surplus amount to the other resource agents that identifies one or more amounts, times or other terms of availability of the surplus resource. Each of the resource agents may locally store notices or published offers of surpluses in their respective availability resource maps. This may entail populating and maintaining a list of current offers that are advertised or published to the registered resource agents that identifies offering resource agents and the terms of each resource offer.

At 332 the resource agent receives a communication from another of the resource agents accepting a published offer of the surplus resource amount, or requesting all or part of the surplus resource amount as identified in the updated availability resource map. At 334 the resource manager determines whether to acknowledge or execute the accepted offer, or to otherwise agree to provide all or part of the surplus amount to the other resource manager in response to the request/acceptance received at 332. The decision process at 334 may include determining a best fit or most favorable terms, and responsively selecting between multiple accepted offers or requests. Accordingly, if the offer is acknowledged or provision of requested surplus resource otherwise agreeable to the resource manager, at 336 the resource manager provides the surplus resource amount for an amount or time specified in the offer or as otherwise determined to be acceptable to the offering resource manager.

Generally, when a resource agent accepts an offer to share the surplus resources of its virtual machine, it compares the requested amount of and time duration for use of the requested resource against its own resource map to gauge how much surplus resource it has available. By taking the time duration for use of resource requested in the loan request into consideration, a resource agent may make sure that the loaning virtual machine does not loan out extra bandwidth beyond what it can afford. In one aspect, confirming fulfillment of an offer includes verifying that another resource request use is not scheduled or expected during the time duration of the requested resource loan. If everything checks out (for example, the requested amount of and time duration for use of the requested resource may be accommodated by its resources as indicated by its own resource map), then the resource agent that received the request replies with an indication that it will loan out the resource as defined by the request (in the requested amount and during the requested time duration).

Once a loaned resource is released or returned by a borrowing resource manager after satisfaction of the amount/time/duration specified at 334, or at 224 (FIG. 2), at 342 the amount, time and/or duration of the actual usage of the shared resource is determined. In one aspect, the amount/time/duration is determined at 342 by a virtual machine licensing agent, which may be a portion or attribute of the resource manager, or it may be a separate entity of the network computing environment. At 344 an amount to charge the borrowing resource manager and/or reward the sharing resource manager for the determined actual usage amount/time/duration of the shared resource is determined as a function of information about the respective loaner and borrower resource managers.

The amounts charged or rewarded by the virtual machine licensing agent may be determined as a function of relative statuses, for example a resource manager with priority status may be charged a higher cost for use of a shared resource. The amount of the charged cost or reward may also be determined as a function of a status of the request or the broadcast offer, for example a priority offer, or the request may incur higher costs or rewards relative to a standard offer or request. Still other differentiated services and costs and rewards may be practiced, and aspects of the present invention provide for flexibility in determining and executing charges or rewards for each of the loaner and recipient of the surplus resources.

Thus, aspects of the present invention describe methods, processes and systems for network computing services to negotiate among themselves with regard to the use of limited resources to address a temporary spike in resource needs. Aspects provide an autonomic scheme that allows virtual machines to participate in resource negotiation by identifying a period when more resources are needed, and initiating a request to loan memory temporarily from a peer virtual machine in the network computing. In one aspect, this approach distributes resource more optimally across all participating network computing services over other, prior art techniques.

In some aspects, the consideration for sharing a surplus resource is determined on a pay-as-you-go offering basis, wherein a network computing environment user pays only for the extra resources or bandwidth actually used, and only for a time duration period it was allocated. In another aspect, any user service that makes a resource loan may be awarded some reward, in one example in terms of a reduction in usage fees charged by a common infrastructure provider, with a corresponding increase in fees charged to the borrowing virtual machine.

Aspects of the present invention enable a resource manager to acquire additional resources on a temporary basis in order to accommodate unexpected or unplanned spikes in demands for services. For example, a retail web page virtual machine may unexpectedly experience a spike in demand for storage device memory capacity or processing unit duty cycle services that exceeds the amount of memory or processing unit resources that it has available under normal contractual agreement terms with an infrastructure provider. Rather than fail to meet the requested services, or have to pay additional fees to the infrastructure provider for the additional resources necessary to satisfy the demand spike, aspects of the present invention enable a plurality of registered virtual machines to cooperatively agree to pool and share any excess, surplus resources, in some examples creating virtually free amounts of surplus resource amount or time availability.

Compensation or consideration for receiving and using surplus resources from another virtual machine may be defined by licensing agreements among the sharing cloud members. Consideration may include agreeing to identify and provide some surplus resources contemporaneously, or during some other (previous or later) time period, to the other registered virtual machines. In some aspects, the user borrowing the resources may reimburse the provider for an agreed cost of services, or a discount may be granted to a member who shares services, without requiring services from any other of the club members. In one aspect, an entity may have multiple cloud network computing environment virtual machine services, wherein if a demand spike can be serviced by one of its own cloud services, then it may do so at no additional charge or at one cost or charge rate, and wherein a different cost or charge rate is applied in the surplus must instead be acquired by reaching out to other members of the cloud.

A variety of thresholds may be used to trigger offers of and requests for surplus resources. In one example, additional resources may be sought when the current or projected demand meets 20% of all available resources, in one aspect to ensure that the additional resources are in place before 100% of the virtual machines resources are committed. In contrast, in the prior art when a threshold of available resources is hit, such as the 20% mark, generally a cloud application throttles down or otherwise decreases its performance in order to stay within its allocated resources, or to avoid being hit with premium charges for going over allocation limits agreed to with an infrastructure provider. Instead, in aspects of the present invention, if the resource agent can find resources available from another of the registered virtual machines registered in the cloud environment, then there is no exposure to premium rates for the resource provision by the network, or need to throttle down performance to avoid securing the additional resources.

In one aspect, a set of cloud application virtual machines may be linked, wherein if any one of the set spikes, a request for shared services will go out to other members of the same set. Different groups and sets of members may be formed as defined by different agreement terms. Thus, a resource manager may belong to a first group wherein all of the members agree to pool and share surplus resources without cost, and also to a second group wherein the members agree to pay consideration to any member providing a surplus resource.

Aspects may be flexible with regard to amounts and time spans for resource sharing. In some examples, resource sharing occurs in stages, perhaps requesting and receiving ten minutes of excess processing unit time, but only using the offered time in discrete increments spaced over time (for example, one minute during any five minutes, no more than two minutes during the next ten minutes, etc.). The resource agents may also divide up a single request, so that more than one agent satisfies the request. For example, a request for one hour of surplus processing unit time may be met by four different resource agent offers of fifteen minutes each.

In some aspects, the sharing of surplus resources may be scheduled on a regular or default basis. For example, virtual machines operating or serving customers during different business day time zones may share resources on an on-going, reciprocal basis; when a portion of a business day ends for a first virtual machine in a North American continent time zone, it may make a portion (or even all) of its resources available to a second virtual machine that serves customers only during a business day in an Asian continent time zone that does not overlap with said portion of the North American continent time zone business day, and vice versa. These first and second virtual machines may therefore continually share respective surplus resources during specific time periods under a standing agreement to share services.

In some examples, a request or need for additional, surplus services, or offer of same, may be revised due to observing actual usage. For example, a request that routinely is made at a specific time on a Monday for one hour may be observed to frequently require additional time of two more hours in order to satisfy actual spikes in service, which was larger than anticipated by the resource agent. Thus, the resource agent may request additional surplus resources beyond an expected or projected need in order to build in a buffer, cushion or tolerance, to avoid coming up short in satisfying actual resource needs.

In one aspect, the offers and acceptances of resource surpluses may be voluntary or provisional in nature. A broadcast or published offer may be contingent on voluntary confirmation or approval of the offer and acceptance by the offering resource agent, and the offer may be provisional and terminable at any time by the offering machine. Thus, if circumstances change and what was once surplus is now needed, or the surplus determination was erroneous, some sharing agreements may allow the offering virtual machine to unilaterally cancel the offer or a current sharing of its resources. In such an agreement, the virtual machines do not risk having to throttle down or otherwise limit their own service performance to satisfy offers to help other machines. In such an arrangement, the offer is entirely voluntary and optional on the part of the service offering shared additional resources.

In some aspects, requests for surplus resources may have differentiated priorities. For example, a request may be noted as a critical request, conveying that the requester really needs this additional resource, and wherein all the services may agree that such a critical request may receive a higher priority over other requests for a similar time frame and resource.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be any tangible storage medium that is not a computer readable signal medium, and examples include an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wire line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 4:
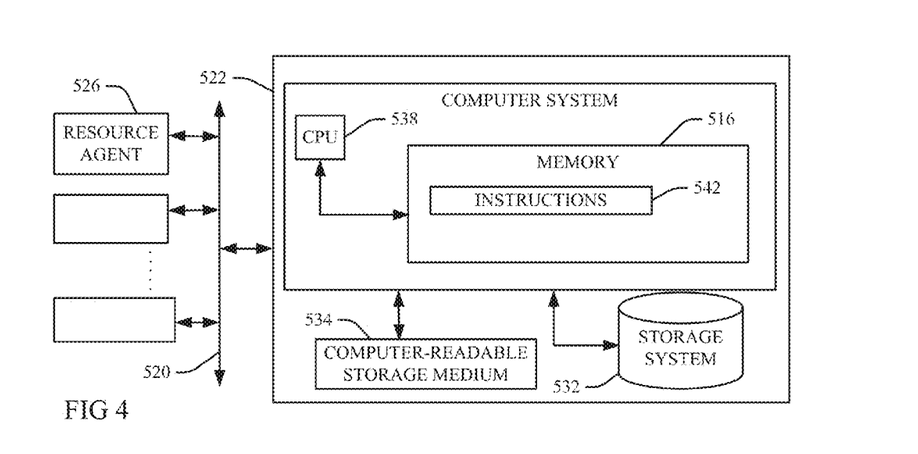
FIG. 4 is a block diagram illustration of a computer system implementation of an aspect of the present invention.

Referring now to FIG. 4, an exemplary computerized implementation of an aspect of the present invention includes a computer system or other programmable device 522 that provides a virtual machine in communication with a plurality of other virtual machines 526 within a network computing environment 520. Instructions 542 reside within computer readable code in a computer readable memory 516, or in a computer readable storage system 532, or other tangible computer readable storage medium 534 that is accessed through the computer network infrastructure 520 by a Central Processing Unit (CPU) 538. Thus, the instructions, when implemented by the processing unit 538, cause the processing unit 538 to enable the virtual machines to directly negotiate among themselves with regard to the efficient sharing of limited resources as described above with respect to FIGS. 1, 2 and 3.

In one aspect, the present invention may also perform process steps of the invention on a subscription, advertising, and/or fee basis. That is, a service provider could offer to integrate computer-readable program code into the computer system 522 to enable the computer system 522 to enable virtual machines to directly negotiate among themselves with regard to the efficient sharing of limited resources as described above with respect to FIGS. 1, 2 and 3. The service provider can create, maintain, and support, etc., a computer infrastructure, such as the computer system 522, network environment 520, or parts thereof, that perform the process steps of the invention for one or more customers. In return, the service provider can receive payment from the customer(s) under a subscription and/or fee agreement and/or the service provider can receive payment from the sale of advertising content to one or more third parties. Services may include one or more of: (1) installing program code on a computing device, such as the computer device 522, from a tangible computer-readable medium device 532 or 534; (2) adding one or more computing devices to a computer infrastructure; and (3) incorporating and/or modifying one or more existing systems of the computer infrastructure to enable the computer infrastructure to perform the process steps of the invention.

The terminology used herein is for describing particular aspects only and is not intended to be limiting of the invention. As used herein, the singular forms "a", "an" and "the" are intended to include the plural forms as well, unless the context clearly indicates otherwise. It will be further understood that the terms "include" and "including" when used in this specification, specify the presence of stated features, integers, steps, operations, elements, and/or components, but do not preclude the presence or addition of one or more other features, integers, steps, operations, elements, components, and/or groups thereof. Certain examples and elements described in the present specification, including in the claims and as illustrated in the figures, may be distinguished or otherwise identified from others by unique adjectives (e.g. a "first" element distinguished from another "second" or "third" of a plurality of elements, a "primary" distinguished from a "secondary" one or "another" item, etc.). Such identifying adjectives are generally used to reduce confusion or uncertainty, and are not to be construed to limit the claims to any specific illustrated element or embodiment, or to imply any precedence, ordering or ranking of any claim elements, limitations or process steps.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The aspect was chosen and described in order to best explain the principles of the invention and the practical application, and to enable others of ordinary skill in the art to understand the invention for various embodiments with various modifications as are suited to the particular use contemplated.

The flowchart and block diagrams in the figures illustrate the architecture, functionality, and operation of possible implementations of systems, methods and computer program products according to various aspects of the present invention. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for network computing environment services to negotiate with regard to the sharing of resources, the method comprising:

a first resource agent of a first one of a plurality of network computing environment virtual machines monitoring resource allocation patterns of at least one limited resource of the first virtual machine;

the first resource agent updating usage data in a resource availability map of the first virtual machine in response to the monitoring, wherein the update comprises at least one of a current limited resource usage, a scheduled increase or decrease of the current usage, or a projected increase or decrease of the current usage;

comparing the updated usage data in the resource availability map usage data to a minimum operational requirements threshold, and to a surplus amount threshold that is greater than or equal to the minimum operational requirements threshold;

in response to the updated usage data in the resource availability map failing to meet the minimum operational requirements threshold, determining an additional shortfall amount of resources that are needed in view of the updated usage data to meet the minimum operational requirements threshold, searching the resource availability map for offers of the shortfall amount of resources from the resource agents of one or more other virtual machines that are registered into a resource sharing arrangement with the first virtual machine within the network computing environment, and sending out a request to one of the other resource agents that is associated with an offer of the shortfall amount of resources; and in response to the compared updated usage data in the resource availability map meeting the minimum operational requirements threshold, determining a surplus amount of a resource that exceeds an amount of the resource needed to meet the surplus amount threshold, creating an offer of the surplus amount of resources, and broadcasting the offer to each of the resource agents of the other virtual machines that are registered into the resource sharing arrangement with the first virtual machine within the network computing environment.

2. The method of claim 1, further comprising:

the first resource agent broadcasting updates to the resource availability map data to each of the plurality of resource agents of the virtual machines that are registered into the resource sharing arrangement with the first virtual machine within the network computing environment environment; and in response to the updated usage data in the resource availability map failing to meet the minimum operational requirements threshold:

searching the resource availability map for usage data broadcast and stored from the other virtual machines;

identifying a likely or indicated resource surplus on a second of the virtual machines from the usage data broadcast and stored from the second virtual machine; and sending out a request to a resource agent of the second virtual machine that details a requested amount of the resource, and a requested time duration for use of the requested resource.

3. The method of claim 1, wherein the offer of the surplus amount of resources that is broadcast to each of the resource agents of the other virtual machines that are registered into the resource sharing arrangement with the first virtual machine within the network computing environment environment comprises an offered amount of the resource and a time of execution and a time duration of the offer of the offered amount of the resource.

4. The method of claim 1, further comprising:
the first resource agent selecting a group of the offers in response to more favorable terms of each of the selected group of offers relative to terms of other, unselected ones of the offers; and
the first resource agent executing each of the selected group of offers by acquiring portions of an entirety of the additional shortfall amount of resources from virtual machines of the resource agents associated with each of the selected group of offers.

5. The method of claim 1, further comprising:
integrating computer-readable program code into a computer system comprising a processing unit, a computer readable memory and a computer readable tangible storage medium, wherein the computer readable program code is embodied on the computer readable tangible storage medium and comprises instructions that, when executed by the processing unit via the computer readable memory, cause the processing unit to provide the first resource agent that:
monitors resource allocation patterns of at least one limited resource of the first virtual machine;
updates usage data in the resource availability map in response to the monitoring, compares the updated usage data in the resource availability map usage data to the minimum operational requirements threshold and to the surplus amount threshold;
determines the additional shortfall amount of resources, searches the resource availability map for the offers of the shortfall amount of resources from the resource agents of one or more other virtual machines that are registered into the resource sharing arrangement with the first virtual machine within the network computing environment, and sends out the request to one of the other resource agents that is associated with the offer of the shortfall amount of resources, in response to the updated usage data in the resource availability map failing to meet the minimum operational requirements threshold; and
determines the surplus amount of the resource, creates the offer of the surplus amount of resources, and broadcasts the offer to each of the resource agents of the other virtual machines that are registered into the resource sharing arrangement with the first virtual machine within the network computing environment, in response to the compared updated usage data in the resource availability map meeting the minimum operational requirements threshold.

6. The method of claim 1, further comprising:
a virtual machine licensing agent determining a loaned amount of the resource that was loaned by one of the other virtual machines to the first virtual machine in response to the request sent for the shortfall amount of resources, or that was loaned by the first virtual machine to one of the other virtual machines in response to an acceptance of the offer of the surplus amount of resources broadcast by the first machine; and
the virtual machine licensing agent charging a cost to a one of the first virtual machine and the other virtual machines that borrowed the loaned amount of the resource, or providing a reward to a one of the first virtual machine and the other virtual machines that provided the loaned amount of the resource to the other of the first and the other virtual machines.

7. The method of claim 6, further comprising:
the virtual machine licensing agent determining an amount of the charged cost or the reward as a function of a difference in relative statuses of the first and the other virtual machines.

8. The method of claim 6, further comprising:
the virtual machine licensing agent determining an amount of the charged cost or the reward as a function of a priority status of the request or the broadcast offer.

9. A system, comprising:
a processing unit in communication with a computer readable memory and a tangible computer-readable storage medium;
wherein the processing unit, when executing program instructions stored on the tangible computer-readable storage medium via the computer readable memory, provides a first resource agent of a first virtual machine within a network computing environment, wherein the first resource agent:
monitors resource allocation patterns of at least one limited resource of the first virtual machine;
updates usage data in a resource availability map of the first virtual machine in response to the monitoring, wherein the update comprises at least one of a current limited resource usage, a scheduled increase or decrease of the current usage, or a projected increase or decrease of the current usage;
compares the updated usage data in the resource availability map usage data to a minimum operational requirements threshold, and to a surplus amount threshold that is greater than or equal to the minimum operational requirements threshold;
in response to the updated usage data in the resource availability map failing to meet the minimum operational requirements threshold, determines an additional shortfall amount of resources that are needed in view of the updated usage data to meet the minimum operational requirements threshold, searches the resource availability map for offers of the shortfall amount of resources from the resource agents of one or more other virtual machines that are registered into a resource sharing arrangement with the first virtual machine within the network computing environment, and sends out a request to one of the other resource agents that is associated with an offer of the shortfall amount of resources; and
in response to the compared updated usage data in the resource availability map meeting the minimum operational requirements threshold, determines a surplus amount of a resource that exceeds an amount of the resource needed to meet the surplus amount threshold, creates an offer of the surplus amount of resources, and broadcasts the offer to each of the resource agents of the other virtual machines that are registered into the resource sharing arrangement with the first virtual machine within the network computing environment.

10. The system of claim 9, wherein the first resource agent provided by the processing unit, in response to executing the program instructions stored on the computer-readable storage medium via the computer readable memory, further:
broadcasts updates to the resource availability map data to each of the plurality of resource agents of the virtual machines that are registered into the resource sharing arrangement with the first virtual machine within the network computing environment; and in response to the updated usage data in the resource availability map failing to meet the minimum operational requirements threshold:

searches the resource availability map for usage data broadcast and stored from the other virtual machines;

identifies a likely or indicated resource surplus on a second of the virtual machines from the usage data broadcast and stored from the second virtual machine; and sends out a request to a resource agent of the second virtual machine that details a requested amount of the resource, and a requested time duration for use of the requested resource.

11. The system of claim 9, wherein the first resource agent provided by the processing unit, in response to executing the program instructions stored on the computer-readable storage medium via the computer readable memory, broadcasts the offer of the surplus amount of resources to each of the resource agents of the other virtual machines that are registered into the resource sharing arrangement with the first virtual machine within the network computing environment by including in the offer an offered amount of the resource and a time of execution and a time duration of the offer of the offered amount of the resource.

12. The system of claim 9, wherein the first resource agent provided by the processing unit, in response to executing the program instructions stored on the computer-readable storage medium via the computer readable memory, further:

selects a group of the offers in response to more favorable terms of each of the selected group of offers relative to terms of other, unselected ones of the offers; and executes each of the selected group of offers by acquiring portions of an entirety of the additional shortfall amount of resources from virtual machines of the resource agents associated with each of the selected group of offers.

13. The system of claim 9, wherein the processing unit, when executing the program instructions stored on the computer-readable storage medium via the computer readable memory, further provides a virtual machine licensing agent that:

determines a loaned amount of the resource that was loaned by one of the other virtual machines to the first virtual machine in response to the request sent for the shortfall amount of resources, or that was loaned by the first virtual machine to one of the other virtual machines in response to an acceptance of the offer of the surplus amount of resources broadcast by the first machine; and charges a cost to a one of the first virtual machine and the other virtual machines that borrowed the loaned amount of the resource, or provides a reward to a one of the first virtual machine and the other virtual machines that provided the loaned amount of the resource to the other of the first and the other virtual machines.

14. The system of claim 13, wherein the virtual machine licensing agent provided by the processing unit, in response to executing the program instructions stored on the computer-readable storage medium via the computer readable memory, further:

determines an amount of the charged cost or the reward as a function of a difference in relative statuses of the first and the other virtual machine.

15. The system of claim 13, wherein the virtual machine licensing agent provided by the processing unit, in response to executing the program instructions stored on the computer-readable storage medium via the computer readable memory, further:

determines an amount of the charged cost or the reward as a function of a priority status of the request or the broadcast offer.

16. A computer program product for network computing environment services to negotiate with regard to the sharing of resources, the computer program product comprising:

a computer readable tangible storage medium having computer readable program code embodied therewith, the computer readable program code comprising instructions that, when executed by a computer processing unit, cause the computer processing unit to provide a first resource agent of a first virtual machine within a network computing environment, wherein the first resource agent:

monitors resource allocation patterns of at least one limited resource of the first virtual machine;

updates usage data in a resource availability map of the first virtual machine in response to the monitoring, wherein the update comprises at least one of a current limited resource usage, a scheduled increase or decrease of the current usage, or a projected increase or decrease of the current usage;

compares the updated usage data in the resource availability map usage data to a minimum operational requirements threshold, and to a surplus amount threshold that is greater than or equal to the minimum operational requirements threshold;

in response to the updated usage data in the resource availability map failing to meet the minimum operational requirements threshold, determines an additional shortfall amount of resources that are needed in view of the updated usage data to meet the minimum operational requirements threshold, searches the resource availability map for offers of the shortfall amount of resources from the resource agents of one or more other virtual machines that are registered into a resource sharing arrangement with the first virtual machine within the network computing environment, and sends out a request to one of the other resource agents that is associated with an offer of the shortfall amount of resources; and in response to the compared updated usage data in the resource availability map meeting the minimum operational requirements threshold, determines a surplus amount of a resource that exceeds an amount of the resource needed to meet the surplus amount threshold, creates an offer of the surplus amount of resources, and broadcasts the offer to each of the resource agents of the other virtual machines that are registered into the resource sharing arrangement with the first virtual machine within the network computing environment.

17. The computer program of claim 16, wherein the computer readable program code instructions, when executed by the computer processing unit, further cause the first resource agent provided by the computer processing unit to:

broadcast updates to the resource availability map data to each of the plurality of resource agents of the virtual machines that are registered into the resource sharing arrangement with the first virtual machine within the network computing environment; and in response to the updated usage data in the resource availability map failing to meet the minimum operational requirements threshold:

search the resource availability map for usage data broadcast and stored from the other virtual machines;

identify a likely or indicated resource surplus on a second of the virtual machines from the usage data broadcast and stored from the second virtual machine; and send out a request to a resource agent of the second virtual machine that details a requested amount of the resource, and a requested time duration for use of the requested resource.

18. The computer program of claim 16, wherein the computer readable program code instructions, when executed by the computer processing unit, further cause the first resource agent provided by the computer processing unit to:

broadcast the offer of the surplus amount of resources to each of the resource agents of the other virtual machines that are registered into the resource sharing arrangement with the first virtual machine within the network computing environment by including in the offer an offered amount of the resource and a time of execution and a time duration of the offer of the offered amount of the resource.

19. The computer program of claim 16, wherein the computer readable program code instructions, when executed by the computer processing unit, further cause the first resource agent provided by the computer processing unit to:

select a group of the offers in response to more favorable terms of each of the selected group of offers relative to terms of other, unselected ones of the offers; and execute each of the selected group of offers by acquiring portions of an entirety of the additional shortfall amount of resources from virtual machines of the resource agents associated with each of the selected group of offers.

20. The computer program of claim 16, wherein the computer readable program code instructions, when executed by the computer processing unit, further cause the computer processing unit to provide a virtual machine licensing agent that:

determines a loaned amount of the resource that was loaned by one of the other virtual machines to the first virtual machine in response to the request sent for the shortfall amount of resources, or that was loaned by the first virtual machine to one of the other virtual machines in response to an acceptance of the offer of the surplus amount of resources broadcast by the first machine; and charges a cost to a one of the first virtual machine and the other virtual machines that borrowed the loaned amount of the resource, or provides a reward to a one of the first virtual machine and the other virtual machines that provided the loaned amount of the resource to the other of the first and the other virtual machines.

\* \* \* \* \*